US006534214B1

(12) United States Patent
Nishijima et al.

(10) Patent No.: US 6,534,214 B1
(45) Date of Patent: Mar. 18, 2003

(54) LITHIUM SECONDARY CELL

(75) Inventors: Motoaki Nishijima, Gose (JP);
Takehito Mitate, Yamatotakada (JP);
Kazuo Yamada, Kitakatsuragi-gun (JP);
Naoto Nishimura, Kashihara (JP);
Naoto Torata, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/678,341

(22) Filed: Oct. 3, 2000

(30) Foreign Application Priority Data

Oct. 5, 1999 (JP) .............................. 11-284349

(51) Int. Cl.[7] ........................ H01M 4/62; H01M 10/40
(52) U.S. Cl. ........................................ 429/212; 429/307
(58) Field of Search ................... 429/212, 307, 429/316

(56) References Cited

U.S. PATENT DOCUMENTS

| 5,296,318 A | * | 3/1994 | Gozdz et al. ............... 429/316 |
| 5,460,904 A | * | 10/1995 | Gozdz et al. ............... 429/316 |
| 5,587,253 A | * | 12/1996 | Gozdz et al. ............... 429/316 |
| 5,888,672 A | * | 3/1999 | Gustafson et al. ...... 429/212 X |
| 6,077,627 A | * | 6/2000 | Bäuerlein ............... 429/307 X |

FOREIGN PATENT DOCUMENTS

JP        8-222235        8/1996

* cited by examiner

Primary Examiner—Stephen Kalafut
(74) Attorney, Agent, or Firm—Nixon & Vanderhye

(57) ABSTRACT

A lithium secondary battery includes a positive electrode containing a first solid electrolyte; a negative electrode containing a second solid electrolyte; and a layer of a third solid electrolyte between the positive and negative electrodes.

16 Claims, 2 Drawing Sheets

LITHIUM SECONDARY CELL

CROSS-REFERENCE TO RELATED APPLICATION

This application is related to Japanese application No. Hei 11(1999)-284349 filed on Oct. 5, 1999, whose priority is claimed under 35 USC §119, the disclosure of which is incorporated by reference in its entirety.

BACKGROUND OF THE INVENTION

1. Field of the Invention

The present invention relates to a lithium secondary cell having solid electrolytes.

2. Description of the Related Art

A secondary cell has been widely used as a power supply for portable appliances in view of economics. The secondary cell includes various types. At present, a nickel-cadmium cell is most common, and a nickel-hydrogen cell has been lately widespread. Further, a lithium secondary cell which is superior to the nickel-cadmium cell or the nickel-hydrogen cell in terms of output voltage and energy density is becoming a leading secondary cell.

In this lithium secondary cell, lithium cobalt oxide ($LiCoO_2$), lithium nickel oxide ($LiNiO_2$) or a solid solution thereof ($Li(Co_{1-x}Ni_x)O_2$ in which $0<x<1$) or lithium manganese oxide ($LiMn_2O_4$) having a spinel structure is used in a positive electrode, a negative electrode material made of carbon, such as graphite is used in a negative electrode, and an electrolyte in which a solvent is a liquid organic compound and a solute is a lithium compound is used.

In this lithium secondary cell, some problems have been pointed out. One of them is caused by a combination of an electrolyte and carbon, which is a negative electrode material.

Graphite as a negative electrode material has a potential, to. metallic lithium, of 0.1 to 0.2 V on average which is close to that of metallic lithium, and a capacity which is as great as 375 mAh/g. Thus, it is preferable as a negative electrode material of the lithium secondary cell.

However, when graphite is used as the negative electrode material and propylene carbonate as a solvent, propylene carbonate is reduced in a reaction of lithium insertion to cause decomposition. Thus, it cannot be used in a cell.

In order to solve this problem, the following two methods have been generally used at present.

A first method is one using an electrolyte in which a solvent is ethylene carbonate. When ethylene carbonate is used as a solvent, the decomposition reaction of the electrolyte on carbon is inhibited, and lithium can be inserted into or deserted from carbon. However, since ethylene carbonate has a melting point of 39.0° C., solidification occurs at room temperature with ethylene carbonate when used alone. Thus, it cannot be used in a cell. Accordingly, the melting point can be decreased by mixing ethylene carbonate with a different organic solvent. Nevertheless, a conductivity is extremely decreased at a temperature of approximately 0° C., and it cannot be used in a cell.

Thus, when ethylene carbonate is used as a solvent, low-temperature characteristics are worsened.

A second method is one in which a carbonaceous material having a relatively low degree of graphitization is used in a negative electrode. In the carbonaceous material, propylene carbonate is used as an electrolyte, whereby a reaction of lithium insertion or desertion proceeds without a decomposition reaction.

Nevertheless, the carbonaceous material having a relatively low crystallinity has a high potential to lithium compared with graphite having a high crystallinity. Accordingly, when a lithium secondary battery is constructed from a combination of such a carbonaceous material with a positive electrode material, there is a defect that its output potential is lower than that of a lithium secondary battery using graphite having a high crystallinity.

That is, a lithium secondary cell currently on the market is classified into a cell using ethylene carbonate and a graphite material and having poor low-temperature characteristics and a cell using propylene carbonate and a carbonaceous material and having a poor output potential.

Meanwhile, a solid electrolyte obtained by solidifying or gelling an organic electrolyte with a polymer is also available. However, since the solid electrolyte contains ethylene carbonate or propylene carbonate in the electrolyte, it still involves the problems that the decomposition on carbon occurs, the low-temperature characteristics are poor and the output potential is decreased.

Japanese Unexamined Patent Publication No. Hei 8(1996)-222235 discloses that the decomposition of a solid electrolyte is inhibited by using a solid electrolyte having a noble potential window in a solid electrolyte in contact with a positive electrode and a solid electrolyte having a base potential window in a solid electrolyte in contact with a negative electrode, whereby a cell having a low inner resistance and a great discharge capacity can be formed. This document however concerns with a technique for inhibiting the decomposition of the electrolyte, and low-temperature characteristics and load characteristics still remain unresolved.

SUMMARY OF THE INVENTION

Under these circumstances, an object of the invention is to provide a lithium secondary cell having a high output potential and excellent in low-temperature characteristics and negative electrode characteristics. The present invention provides a lithium secondary battery comprising a positive electrode containing a first solid electrolyte; a negative electrode containing a second solid electrolyte; and a layer of a third solid electrolyte between the positive and negative electrodes.

In order to overcome the problems, the present inventors have conducted various investigations and have consequently found that the problems can be solved by using solid electrolytes containing different electrolytes in a positive electrode and a negative electrode. That is, various electrode materials and organic solvent electrolytes have been studied, and it have consequently been found that a lithium secondary cell having a high output potential and excellent in low-temperature characteristics and load characteristics can be provided by incorporating solid electrolytes having different compositions in a positive electrode and a negative electrode and interposing a solid electrolyte layer having a third composition between the two electrodes.

Figure 1:
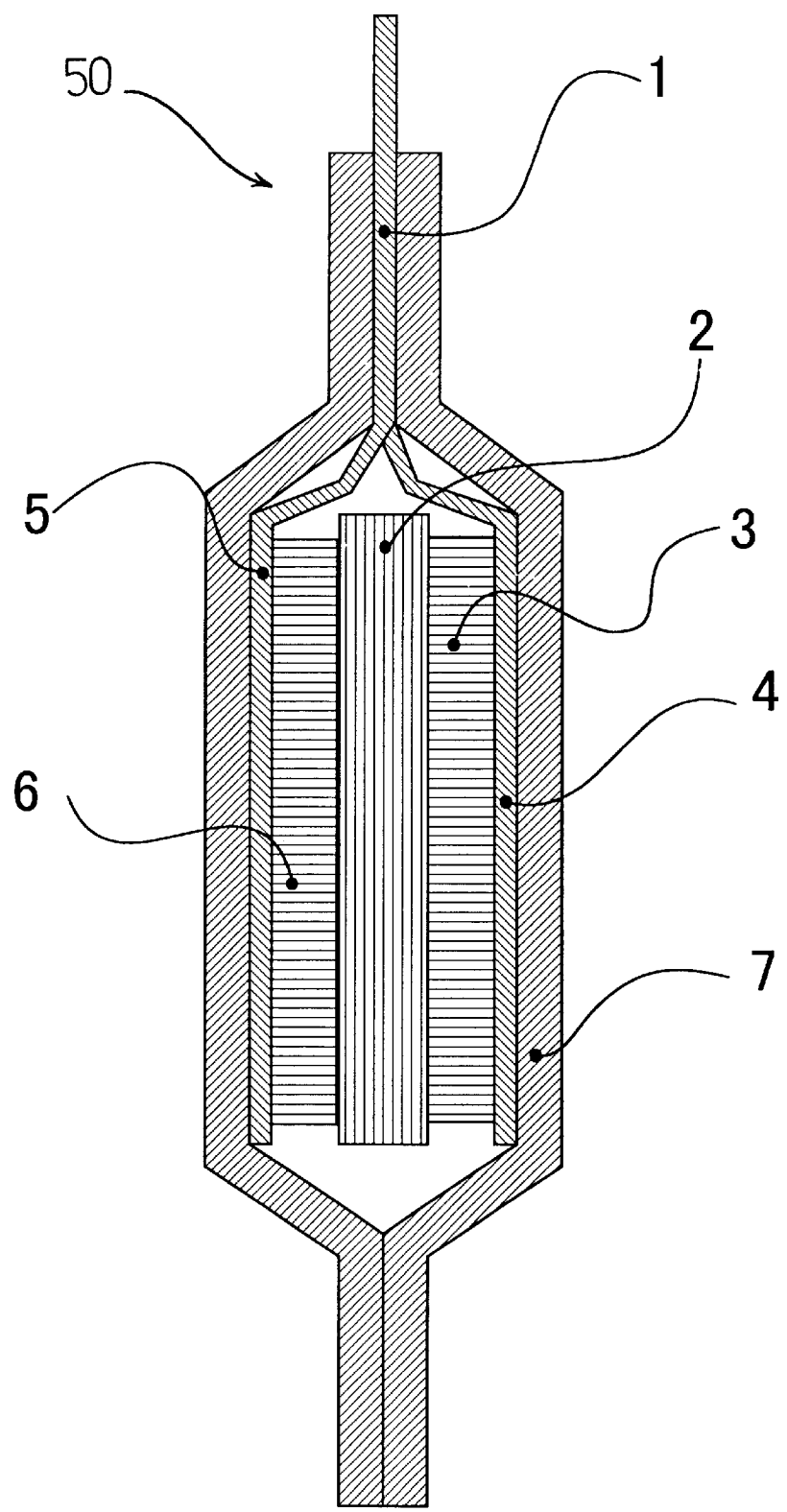
FIG. 1 is a sectional view showing a basic structure of a lithium secondary cell of the invention.

In the drawings, 1 is an electrode terminal, 2 a third solid electrolyte layer, 3 a positive electrode, 4 a positive electrode current collector, 5 a negative electrode current collector, 6 a negative electrode, 7 an external resin film, 8 a positive electrode terminal, 9 a negative electrode terminal, 10 a positive electrode, 11 a third solid electrolyte layer, 12 a negative electrode, 13 an external resin film, 20 a lithium secondary cell and 50 a lithium secondary cell.

DETAILED DESCRIPTION OF THE INVENTION

FIG. 1 shows a basic structure of the lithium secondary cell of the invention. In FIG. 1, 1 an electrode terminal, 2 a third solid electrolyte layer of the invention, 3 a positive electrode made of a positive electrode material and the first solid electrolyte, 4 a positive electrode current collector, 5 a negative electrode current collector, 6 a negative electrode made of a negative electrode material (negative electrode active substance) and the second solid electrolyte, and 7 an external resin film for shutting off the lithium secondary cell from the outside air. In the lithium secondary cell 50, the positive electrode 3 and the negative electrode 6 contain different types of solid electrolytes. Further, a third solid electrolyte layer 2 containing another type of a solid electrolyte is interposed between the positive electrode 3 and the negative electrode 6.

The solid electrolyte used in the lithium secondary cell 50 is first described. The solid electrolyte is made of a polymer, a solvent and an solute, and the polymer acts as a support of the solvent and the solute.

Examples of the solvents in the positive electrode 3, the negative electrode 6, and the third solid electrolyte layer 2 include cyclo carbonates such as propylene carbonate, ethylene carbonate and butylene carbonate; chain carbonates such as diethyl carbonate, dimethyl carbonate, and methylethyl carbonate; lactones such as γ-butyrolactone, γ-valerolactone, and δ-valerolactone; cyclic ethers such as tetrahydrofuran and 2-methyltetrahydrofuran; ethers such as dioxolane, diethyl ether, dimethoxyethane, diethoxyethane and methoxyethoxyethane; esters such as dimethyl sulfoxide, acetonitrile, methyl formate, methyl acetate, and ethyl acetate; glymes such as methyl diglyme and ethyl diglyme; alcohols such as ethylene glycol, methyl cellosolve, and glycerin; nitrites such as acetonitrile, propionitrile, methoxyacetonitrile, and 3-methoxypropionitrile; amides such as N-methylformamide, N-ethylformamide, N,N-dimethylformamide, N,N-diethylformamide, N-methylacetamide, N-ethylacetamide, N,N-dimethylacetamide, and N-methylpyrrolidone; sulfolanes such as sulfolane and 3-methylsulfolane; and phosphates. such as trimethyl phosphate and triethyl phosphate. These solvents may be used either singly or in combination.

The solvent of the solid electrolyte in the positive electrode 3 is preferably a solvent, among those listed above, which is hard to be oxidized with the potential of the positive electrode. Specifically, the solvent containing propylene carbonate is preferable.

The solvent of the solid electrolyte in the negative electrode 6 is preferably a solvent which is excellent in reducibility in the vicinity of the potential of the negative electrode and which does not cause a decomposition reaction on a carbonaceous material. Specifically, a solvent containing ethylene carbonate is preferable.

The solvent of the third solid electrolyte layer 2 is preferably a solvent which has a high lithium ion conductivity and which does not decrease a lithium ion conductivity at a low temperature. The layer of the third solid electrolyte may preferably be a solid electrolyte containing a lactone. Specifically, a solvent containing γ-butyrolactone or a mixture of γ-butyrolactone and diethyl carbonate is preferable.

Examples of the solute in the positive electrode 3, the negative electrode 6 and the third solid electrolyte layer 2 include lithium salts such as lithium perchlorate, lithium borofluoride, lithium hexafluorophosphate, lithium hexafluoroarsenite, lithium trifluoromethanesulfonate, lithium halide, and lithium chloroaluminate. These may be used either singly or in combination.

Examples of the monomer for obtaining the polymer which acts as the support of the solvent and the solute include ethylene oxide and propylene oxide. These monomers may be used either singly or in combination. Or, besides these monomers, prepolymers thereof may be used.

The solid electrolyte in the positive electrode 3, the negative electrode 6 and the third solid electrolyte layer 2 can be produced by mixing the solvent and the solute with the monomer, and conducting a polymerization reaction or a crosslinking reaction for solidification.

When the amount of the monomer relative to the solvent is too small, the solidification is hardly conducted. When it is too large, the lithium ion conductivity is inhibited. Thus, the amount of the monomer is preferably between 0.1 and 50% in terms of a volume ratio. Further, an initiator for expediting the polymerization reaction or the crosslinking reaction may be added. Examples of the polymerization initiator include azoisobutyronitrile and benzoyl peroxide. These initiators may be used either singly or in combination.

The solid electrolyte can also be produced by using polymers such as polyvinylidene fluoride, hexafluoropropylene, polymethyl methacrylate, and polyvinyl chloride, either singly or in combination, dissolving the same in a solvent such as tetrahydrofuran and N-methyl-2-pyrrolidone, for casting, removing the solvent through drying and impregnating the residue with the above-described solvent. Alternatively, it is also possible that the solvent and the solute are mixed with polyacrylonitrile, methyl acrylate, or vinyl acetate, and the polymerization is conducted through heating for solidification.

As the third solid electrolyte layer 2 of the invention, a product obtained by impregnating a support such as porous polyethylene, porous polypropylene, or a nonwoven fabric, with the solvent may be used. In this instance, the solid electrolyte layer 2 can be formed by impregnating the support with the liquid electrolyte and polymerizing this electrolyte with light or heat or removing the solvent.

The third solid electrolyte layer 2 of the invention is not necessarily of a single structure, and it may have a multilayer structure in its inside. Further, for preventing diffusion of the solvent between the positive electrode 3 and the third solid electrolyte layer 2 or between the negative electrode 6 and the third solid electrolyte layer 2 or for increasing the adhesion in the interface between the positive electrode 3 or the negative electrode 6 and the solid electrolyte layer, the third solid electrolyte layer 2 may be surface-roughened, or another type of a solid electrolyte layer may further be mounted on the surface of the third solid electrolyte layer 2. When the thickness of the third solid electrolyte layer 2 is too low, short-circuiting occurs between the positive electrode 3 and the negative electrode 6. Meanwhile, when the thickness of the third solid electrolyte layer 2 is too great, current characteristics in a high current of a cell are decreased, or an energy density of a cell is decreased. Accordingly, the thickness is preferably between 1 and 500 μm.

When water is contained in the solvent for forming the electrolyte, decomposition of water occurs as a side reaction in charge and discharge of the cell. Thus, the decrease in efficiency of the cell itself or the decrease in the cycle life of the cell is invited, or a gas is generated. Accordingly, the water content in the solvent is 1,000 ppm or less, preferably 100 ppm or less, if possible. To this end, it is advisable that the solvent is dehydrated by the treatment with a molecular sieve, an alkali metal, an alkaline earth metal or activated aluminum as required.

The positive electrode material of the positive electrode 3 is formed by mixing a powder of a transition metal oxide or a lithium transition metal oxide as a positive electrode active substance with a conductive material and a binder.

Examples of the transition metal oxide include vanadium oxide ($V_2O_5$) and chromium oxide ($Cr_3O_8$). Examples of the lithium transition metal oxide include lithium cobalt oxide ($Li_xCoO_2$: $0<x<2$), lithium nickel oxide ($Li_xNiO_2$: $0<x<2$), lithium nickel cobalt double oxide ($Li_x(Ni_{1-y}Co_y)O_2$: $0<x<2$, $0<y<1$), lithium manganese oxide ($Li_xMn_2O_4$: $0<x<2$, $Li_xMnO_2$: $0<x<2$), lithium vanadium oxide ($LiV_2O_5$, $LiVO_2$), lithium tungsten oxide ($LiWO_3$) and lithium molybdenum oxide ($LiMoO_3$).

Examples of the conductive material include carbonaceous materials such as acetylene black and a graphite powder, a metallic powder and conductive ceramics.

Examples of the binder include fluoropolymers such as polytetrafluoroethylene and polyvinylidene fluoride, and polyolefin polymers such as polyethylene and polypropylene.

With respect to the mixing amounts, per 100 parts by weight of the lithium transition metal oxide, the amount of the conductive material may be between 1 and 50 parts by weight, and the amount of the binder may be between 1 and 50 parts by weight. When the amount of the conductive material is less than 1 part by weight, the resistance or the polarization of the electrode is increased to decrease the capacity as the electrode. Thus, a practical lithium secondary cell cannot be formed. When the amount of the conductive material is more than 50 parts by weight, the amount of the lithium transition metal oxide in the electrode is decreased to decrease the capacity of the cell. Thus, it is undesirable.

On the other hand, when the amount of the binder is less than 1 part by weight, the bindability is reduced, and an electrode cannot be constructed. Further, when the amount of the binder is larger than 50 parts by weight, the resistance or the polarization of the electrode is increased, and the amount of the lithium transition metal oxide in the electrode is decreased to decrease the capacity of the cell. Thus, no practical cell can be formed.

The positive electrode 3 is formed by dissolving a mixture of the powder of the transition metal oxide or lithium transition metal oxide, the conductive material, and the binder in the solvent such as N-methyl-2-pyrrolidone to form a slurry, coating this slurry on the positive electrode current collector 4 or pressing the mixture as such on the positive electrode current collector 4, drying the resulting product, impregnating this product with a mixture of the electrolyte, the monomer (or the prepolymer), and the initiator, and solidifying the product through light irradiation or with heat. Alternatively, the positive electrode 3 can also be formed by mixing the positive electrode material, the conductive material, the electrolyte, the monomer (or the prepolymer), and the initiator and solidifying them through light irradiation or with heat.

Examples of the negative electrode material of the negative electrode 6 include metallic lithium, lithium alloys such as a lithium-aluminum alloy, substances capable of inserting or deserting a lithium ion, for example, conductive polymers such as polyacetylene, polythiophene, and poly-p-phenylene, pyrolytic carbon, pyrolytic carbon obtained by decomposition in. a vapor phase in the presence of a catalyst, carbon obtained by burning pitch, coke, or tar, carbon obtained by burning high-molecular substances such as cellulose and a phenol resin, graphites such as natural graphite, synthetic graphite, and expanded graphite, and substances capable of inserting or deserting a lithium ion, such as $WO_2$ and $MoO_2$. They can be used either singly or as a complex. Of these, carbonaceous materials, namely, pyrolytic carbon, pyrolytic carbon obtained by decomposition in a vapor phase in the presence of a catalyst, carbon obtained by burning pitch, coke or tar, carbon obtained by burning high-molecular substances such as cellulose and a phenol resin, and graphites such as natural graphite, artificial graphite and expanded graphite are preferable.

The negative electrode 6 is formed by dissolving a mixture of the negative electrode materials in the solvent such as N-methyl-2-pyrrolidone to form a slurry, coating this slurry on the negative electrode current collector 5 or pressing the mixture as such on the positive electrode current collector 5, drying the resulting product, impregnating this product with a mixture of the electrolyte, the monomer (or the prepolymer) and the initiator, and solidifying the product through light irradiation or with heat.

Or, the negative electrode 6 can also be formed by mixing a mixture of the negative electrode materials, the electrolyte, and the polymer, and solidifying the resulting mixture through light irradiation or with heat.

As the positive electrode current collector 4 and the negative electrode current collector 5, conductors such as a metallic foil, a metallic mesh, and a metallic nonwoven fabric can be used.

As the external resin film 7, a resin film made of a resin such as polyethylene, polypropylene, or polyvinyl chloride and having a thickness of 5 to 500 μm, or a metallic foil-laminated resin film obtained by laminating aluminum is preferable.

Thus, in the lithium secondary cell of the invention, the electrolyte layers of the positive electrode 3 and the negative electrode 6 are surely separated by the third solid electrolyte layer 2 interposed between the positive electrode 3 and the negative electrode 6. Consequently, the negative electrode 6 and the positive electrode 3 do not contact with each other, and the degradation of the respective electrolytes can be prevented.

In the lithium secondary cell 50 of the invention, the electrolytes are solid, so that they are not mixed with each other. Although the different types of the electrolytes are used, the effects are not decreased.

The cell having the excellent load characteristics can be constructed by mounting the third solid electrolyte layer 2 having a high lithium ion conductivity between the positive electrode 3 and the negative electrode 6.

Further, cyclic carbonate or chain carbonate is used as the first solid electrolyte in the positive electrode 3, preventing the degradation due to the oxidation of the electrolyte. Accordingly, the deterioration of the storage stability of the cell or the deterioration caused by repeating the charge/discharge cycle can be prevented. The first solid electrolyte may preferably be a solid electrolyte containing ethylene carbonate or a mixture of propylene carbonate and diethyl carbonate.

When the solid electrolyte containing cyclic carbonate or chain carbonate is used as the second solid electrolyte to form the negative electrode 6, a decomposition reaction does not occur. Thus, it is possible to conduct insertion and desertion of lithium at high efficiency. Further, since ethylene carbonate of which the performance is poor at a low temperature is present only in the negative electrode 6, the deterioration of the performance of the cell at the low temperature can be prevented. Still further, the use of graphite having a high crystallinity can increase the output potential of the lithium secondary cell 50. The second solid electrolyte may preferably be a solid electrolyte containing ethylene carbonate or a mixture of ethylene carbonate and diethyl carbonate.

In the lithium secondary cell of the invention based on the structure shown in FIG. 1, there is an application example in which the positive electrode and the collector, and the negative electrode and the collector are connected with external electrodes, respectively, and the third solid electrolyte layer is interposed therebetween.

The shape of the lithium secondary cell of the invention is not particularly limited. Examples thereof include, but are not limited to, a cylindrical shape, a button shape, an angular shape and a sheet.

The production of these cells is preferably conducted in an inert atmosphere of argon or in dry air, for preventing invasion of moisture.

EXAMPLES

The invention is specifically described by referring to the following Examples and Comparative Examples. However, the invention is not limited thereto.

Figure 2:
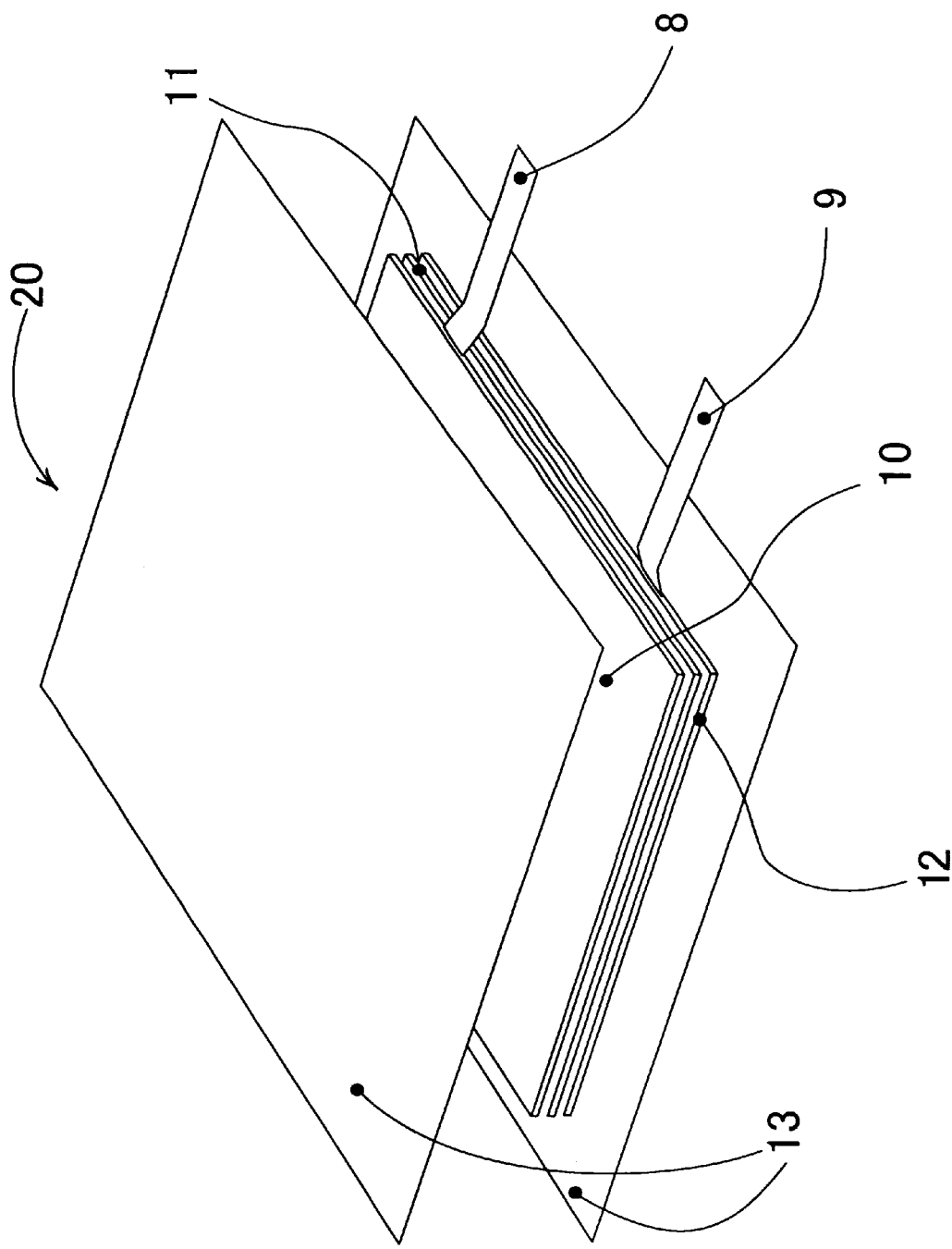
FIG. 2 is a perspective view showing the structure of a lithium secondary cell as an example of the invention obtained in Examples.

FIG. 2 shows a structure of a lithium secondary cell 20 of the invention used in the following Examples. The lithium secondary cell 20 is formed by interposing, between two external resin films 13, a positive electrode 10 made of a positive electrode material and a solid electrolyte, a negative electrode 12 made of a third electrolyte layer 11 a negative electrode material and a solid electrolyte. The positive electrode 10 is connected with a positive electrode terminal 8 (positive electrode current collector), and the negative electrode 12 with a negative electrode terminal 9 (negative electrode current collector) respectively. The positive electrode 10 and the negative electrode 12 have solid electrolytes containing different types of electrolytes, and the third solid electrolyte layer 11 interposed therebetween contains another type of an electrolyte.

Example 1

The lithium secondary cell 20 was produced in the following manner. Lithium cobalt oxide ($LiCoO_2$) was used as the positive electrode active material. $LiCoO_2$ was formed by the known method. From the results of the X-ray diffraction using CuKα rays of an output of 2 kW from a target Cu enclosed tube as an X-ray source, the cobalt valence analysis by the iodometry, and the elemental analysis by ICP (inductively coupled plasma), the sample obtained was identified to be $LiCoO_2$.

The thus-obtained sample was grounded in a mortar and mixed with approximately 10% by weight of acetylene black as a conductive material and approximately 10% by weight of a teflon resin powder as a binder. This mixture was then dissolved in a solvent of N-methyl-2-pyrrolidone to form a slurry. This slurry was applied on an aluminum foil by a doctor blade method, dried, and then pressed.

The thus-obtained positive electrode 10 was impregnated with an electrolyte. The electrolyte for the positive electrode 10 was obtained by dissolving 1 mol/liter of $LiPF_6$ in 50% by volume of propylene carbonate and 50% by volume of diethyl carbonate and mixing the solution with 15% by weight, based on the electrolyte, of ethylene oxide and propylene oxide. The positive electrode 10 was impregnated with this mixed solution, and the copolymerization was conducted through ultraviolet irradiation.

Meanwhile, a natural graphite powder was used as the negative electrode active material. This natural graphite powder was mixed with approximately 10% by weight of a teflon resin powder as a binder. The mixture was dissolved in a solvent of N-methyl-2-pyrrolidone to form a slurry. This slurry was applied on a copper foil, dried, and then pressed.

The thus-obtained negative electrode 12 was impregnated with an electrolyte. The electrolyte of the negative electrode 12 was obtained by dissolving 1 mol/liter of $LiPF_6$ in 50% by volume of propylene carbonate and 50% by volume of diethyl carbonate and mixing the solution with 15% by weight, based on the electrolyte, of ethylene oxide and propylene oxide. The negative electrode 12 was impregnated with this mixed solution, and the copolymerization was conducted through ultraviolet irradiation.

The third solid electrolyte layer 11 was obtained by dissolving 1 mol/liter of LiPF6 in 50% by volume of γ-butyrolactone and 50% by volume of diethyl carbonate, mixing the solution with 15% by weight, based on the electrolyte, of ethylene oxide and propylene oxide, impregnating a nonwoven fabric having a thickness of 20 μm with the resulting mixture and conducting copolymerization through ultraviolet irradiation.

Subsequently, the positive electrode 10, the third solid electrolyte layer 11, and the negative electrode 12 were laminated in this order, and the laminate was held between two external resin films 13 made of an aluminum-laminated resin film. The films 13 were heat-fused to form a sheet-like lithium secondary cell 20.

The thus-obtained cell 20 was charged and discharged with a constant current of 10 mA. The upper limit of the charge potential was set to 4.1 V, and the lower limit to 3.0 V. In the first cycle, the charge capacity was 125 mAh, the discharge capacity was 109.0 mAh, and the charge/discharge efficiency was 87.2%. The average potential in the discharge was 3.7 V.

Comparative Example 1

A cell 20 was produced in exactly the same manner as in Example 1 except that a negative electrode 12 and a solid electrolyte layer 11 were different in composition from those in Example 1. That is, 50% by volume of propylene carbonate and 50% by volume of diethyl carbonate were used in an electrolyte of the negative electrode 12, and a solution of 1 mol/liter of $LiPF_6$ in 50% by volume of propylene carbonate and 50% by volume of diethyl carbonate was used in the third solid electrolyte layer 11.

This cell 20 was charged and discharged with a constant current of 10 mA. The upper limit of the charge potential was set to 4.1 V, and the lower limit 3.0 V. In the first cycle, the charge capacity was 190 mAh, the discharge capacity was 50 mAh, and the charge/discharge efficiency was 26.3%. From the comparison of Example 1 with Comparative Example 1 in the charge/discharge efficiency, it becomes apparent that the cell of the invention has the high charge/discharge efficiency.

Example 2

A cell 20 was produced in exactly the same manner as in Example 1. This cell 20 was repetitively charged and discharged with a constant current of 10 mA, and the charge and discharge capacities were then measured in the 5th cycle. The upper limit of the charge potential was set to 4.1 V, and the lower limit to 3.0 V. In the 5th cycle, the charge capacity was 108 mAh, the discharge capacity was 106 mAh, and the average potential in the discharge was 3.6 V.

Comparative Example 2

A cell 20 was produced in exactly the same manner as in Example 2 except that carbon obtained by burning a phenol resin was used as a negative electrode active material and 50% by volume of propylene carbonate and 50% by volume of diethyl carbonate were used as electrolytes of all of a positive electrode 10, a negative electrode 12 and a third solid electrolyte layer 11.

This cell 20 was repetitively charged and discharged with a constant current of 10 mA, and the charge and discharge capacities were then measured in the 5th cycle. The upper limit of the charge potential was set to 4.1 V, and the lower limit to 3.0 V. In the 5th cycle, the charge capacity was 105 mAh, the discharge capacity was 104 mAh, the average potential in the charge was 3.9 V, and the average potential in the discharge was 3.4 V.

From the comparison of Example 2 with Comparative Example 2 in the discharge potential, it becomes apparent that the cell of the invention has the high output potential.

Example 3

A cell 20 was produced in exactly the same manner as in Example 1. This cell 20 was repetitively charged and discharged with a constant current of 10 mA at different atmospheric temperatures of 25° C. and 0° C. The upper limit of the charge potential was set to 4.1 V, and the lower limit to 3.0 V. At the atmospheric temperature of 25° C. in the 2nd cycle, the charge capacity was 108 mAh, and the discharge capacity was 106 mAh. At the atmospheric temperature of 0° C. in the 2nd cycle, the charge capacity was 102 mAh, and the discharge capacity was 99 mAh.

Comparative Example 3

A cell 20 was produced in exactly the same manner as in Example 3 except that 50% by volume of ethylene carbonate and 50% by volume of diethyl carbonate were used as electrolytes of all of a positive electrode 10, a negative electrode 12 and a third solid electrolyte layer 11.

This cell was repetitively charged and discharged with a constant current of 10 mA at atmospheric temperatures of 25° C. and 0° C. The upper limit of the charge potential was set to 4.1 V, and the lower limit to 3.0 V.

At the atmospheric temperature of 25° C. in the 2nd cycle, the charge capacity was 105 mAh, and the discharge capacity was 102 mAh. At the atmospheric temperature of 0° C. in the 2nd cycle, the charge capacity was 84 mAh, and the discharge capacity was 83 mAh.

From the comparison of Example 3 with Comparative Example 3 in the charge capacity at 0° C., it becomes apparent that the cell of the invention is excellent in the low-temperature characteristics.

Example 4

A cell 20 was produced in exactly the same manner as in Example 1 except that lithium nickel oxide ($LiNiO_2$) was used as a positive electrode active material.

This cell was repetitively charged and discharged with constant currents of 10 mA, 50 mA, and 100 mA. The upper limit of the charge potential was set to 4.1 V, and the lower limit to 3.0 V.

With the constant current of 10 mA, the charge capacity was 108 mAh, and the discharge capacity was 106 mAh. With the constant current of 50 mA, the charge capacity was 103 mAh, and the discharge capacity was 101 mAh. With the constant current of 100 mA, the charge capacity was 95 mAh, and the discharge capacity was 94 mAh.

Comparative Example 4

A cell 20 was produced in exactly the same manner as in Example 1 except that lithium nickel oxide ($LiNiO_2$) was used as a positive electrode active material and 50% by volume of ethylene carbonate and 50% by volume of diethyl carbonate were used as electrolytes.

This cell was repetitively charged and discharged with constant currents of 10 mA, 50 mA, and 100 mA as in Example 4. The upper limit of the charge potential was set to 4.1 V, and the lower limit to 3.0 V.

With the constant current of 10 mA, the charge capacity was 108 mAh, and the discharge capacity was 106 mAh. With the constant current of 50 mA, the charge capacity was 95 mAh, and the discharge capacity was 93 mAh. With the constant current of 100 nA, the charge capacity was 72 mAh, and the discharge capacity was 71 mAh.

From the comparison of Example 4 with Comparative Example 4 in the discharge capacities with 50 mA and 100 mA, it becomes apparent that the cell in Example 4 using γ-butyrolactone having the high lithium ion conductivity in the electrolyte layer is clearly excellent in performance with the high load as compared with the cell in Comparative Example 4.

Example 5

A cell 20 was produced in exactly the same manner as in Example 1 except that lithium manganese oxide ($LiMn_2O_4$) was used as a positive electrode active material. This cell 20 was repetitively charged and discharged with a constant current of 10 mA. The upper limit of the charge potential was set to 5.0 V, and the lower limit to 3.0 V. In the 1st cycle, the charge capacity was 107 mAh, the discharge capacity was 86.5 mAh, and the charge/discharge efficiency was 80.8%.

Comparative Example 5

A cell 20 was produced in exactly the same manner as in Comparative Example 3 except that lithium manganese oxide ($LiMn_2O_4$) was used as a positive electrode active material. This cell 20 was repetitively charged and discharged with a constant current of 10 mA. The upper limit of the charge potential was set to 5.0 V, and the lower limit to 3.0 V. In the 1st cycle, the charge capacity was 125 mAh, the discharge capacity was 52 mAh, and the charge/discharge efficiency was 41.6%.

From the comparison of Example 5 with Comparative Example 5 in the charge discharge efficiency, it becomes apparent that the cell 20 of the invention is excellent in the stability with the high potential.

Example 6

A cell 20 was produced in exactly the same manner as in Example 4. This cell 20 was repetitively charged and discharged with a constant current of 10 mA. The upper limit of the charge potential was set to 4.3 V, and the lower limit of the discharge potential to 3.0 V. This cycle was repeated 100 times. In the 1st cycle, the charge capacity was 125 mAh, and the discharge capacity was 106 mA. In the 100th cycle, the charge capacity was 100 mAh, and. the discharge capacity was 98 mAh. The ratio of the discharge capacity in the 1st cycle and the discharge capacity in the 100th cycle (capacity retention ratio) was 92.5%.

Comparative Example 6

A cell 20 was produced in exactly the same manner as in Comparative Example 5. This cell 20 was charged and discharged with a constant current of 10 mA. The upper limit of the charge potential was set to 4.3 V, and the lower limit of the discharge potential to 3.0 V. This cycle was repeated 100 times. In the 1st cycle, the charge capacity was 119 mAh, and the discharge capacity was 95.5 mAh. In the 100th cycle, the charge capacity was 75 mAh, and the discharge capacity was 74 mAh. The capacity retention ratio was 77.5%.

From the comparison of Example 6 with Comparative Example 6 in the volume retention ratio, it becomes apparent that the cell 20 of the invention is clearly excellent in the stability to the charge/discharge cycle.

The compositions and the capacities of the electrodes in the cells in Examples 1 to 6 and Comparative Examples 1 to 6 are shown in Table 1.

TABLE 1

|  | Positive electrode active substance | Positive electrode | Electrolyte | Negative electrode | Negative electrode active substance | Charge potential V |
|---|---|---|---|---|---|---|
| Example 1 | $LiCoO_2$ | PC 50% + DEC 50% | γBL 50% +DEC 50% | EC 50% +DEC 50% | graphite | 4.1 |
| Comparative Example 1 | $LiCoO_2$ |  | PC 50% + DEC 50% |  | graphite | 4.1 |
| Example 2 | $LiCoO_2$ | PC 50% + DEC 50% | γBL 50% + DEC 50% | EC 50% + DEC 50% | graphite | 4.1 |
| Comparative Example 2 | $LiCoO_2$ |  | PC 50% + DEC 50% |  | carbon | 4.1 |
| Example 3 | $LiCoO_2$ | PC 50% + DEC 50% | γBL 50% + DEC 50% | EC 50% + DEC 50% | graphite | 4.1 |
|  | " | " | " | " | " | " |
| Comparative Example 3 | $LiCoO_2$ |  | EC 50% + DEC 50% |  | graphite | 4.1 |
|  | " |  | " |  | " | " |
| Example 4 | $LiNiO_2$ | PC 50% + DEC 50% | γBL 50% + DEC 50% | EC 50% + DEC 50% | graphite | 4.1 |
|  | " | " | " | " | " | " |
| Comparative Example 4 | $LiNiO_2$ |  | EC 50% + DEC 50% |  | graphite | 4.1 |
|  | " |  | " |  | " | " |
| Example 5 | $LiMn_2O_4$ | PC 50% + DEC 50% | γBL 50% + DEC 50% | EC 50% + DEC 50% | graphite | 5.0 |
| Comparative Example 5 | $LiMn_2O_4$ |  | EC 50% + DEC 50% |  | graphite | 5.0 |
| Example 6 | $LiMn_2O_4$ | PC 50% + DEC 50% | γBL 50% + DEC 50% | EC 50% + DEC 50% | graphite | 4.3 |
|  | " | " | " | " | " | " |
| Comparative Example 6 | $LiMn_2O_4$ |  | EC 50% + DEC 50% |  | graphite | 4.3 |
|  | " |  | " |  | " | " |

|  | Discharge potential V | Charge/ Discharge current mA | Charge/ discharge tempera-ture ° C. | Cycle | Charge capacity mAh | Discharge capacity mAh | Average potential in discharge V |
|---|---|---|---|---|---|---|---|
| Example 1 | 3.0 | 10.0 | 25.0 | 1 | 125.0 | 109.0 | 3.7 |
| Comparative Example 1 | 3.0 | 10.0 | 25.0 | 1 | 190.0 | 50.0 | 3.7 |
| Example 2 | 3.0 | 10.0 | 25.0 | 2 | 108.0 | 106.0 | 3.6 |
| Comparative Example 2 | 3.0 | 10.0 | 25.0 | 2 | 105.0 | 104.0 | 3.4 |
| Example 3 | 3.0 | 10.0 | 25.0 | 2 | 108.0 | 106.0 | 3.6 |
|  | " | " | 0.0 | 2 | 102.0 | 99.0 | 3.5 |
| Comparative Example 3 | 3.0 | 10.0 | 25.0 | 2 | 105.0 | 102.0 | 3.7 |
|  | " | " | 0.0 | 2 | 84.0 | 83.0 | 3.4 |
| Example 4 | 3.0 | 10.0 | 25.0 | 2 | 108.0 | 106.0 | 3.6 |
|  | " | 50.0 | " | 2 | 103.0 | 101.0 | 3.5 |
|  | " | 100.0 | " | 2 | 95.0 | 94.0 | 3.4 |
| Comparative Example 4 | 3.0 | 10.0 | 25.0 | 2 | 108.0 | 106.0 | 3.6 |
|  | " | 50.0 | " | 2 | 95.0 | 93.0 | 3.4 |
|  | " | 100.0 | " | 2 | 72.0 | 71.0 | 3.3 |
| Example 5 | 3.0 | 10.0 | 25.0 | 2 | 107.0 | 86.5 | 3.6 |
| Comparative Example 5 | 3.0 | 10.0 | 25.0 | 2 | 125.0 | 52.0 | 3.6 |
| Example 6 | 3.0 | 10.0 | 25.0 | 2 | 125.0 | 106.0 | 3.6 |
|  | " | " | " | 100 | 100.0 | 98.0 | 3.7 |
| Comparative Example 6 | 3.0 | 10.0 | 25.0 | 2 | 119.0 | 95.0 | 3.7 |
|  | " | " | " | 100 | 75.0 | 74.0 | 3.7 |

PC: propylene carbonate
EC: ethylene carbonate
γBL: γ-butyrolactone

From the results in Table 1, it can be said that the cell 20 of the invention, in which the positive electrode 10 and the negative electrode 12 have the different types of the solid electrolytes and another type of the solid electrolyte layer 11 is interposed between the positive electrode 10 and the negative electrode 12, has the high output potential, is good in the low-temperature characteristics and the load characteristics, is excellent in the stability with the high potential, has the long life upon inhibiting the deterioration of the performance even in repeating the charge/discharge cycle, and is high in the reliability.

Thus, according to the invention, the positive electrode and the negative electrode contain the solid electrolytes of the different compositions, and the solid electrolyte layer of the third composition is interposed between the two electrodes to separate these electrodes. Consequently, the lithium secondary cell having the high output potential and excellent in the low-temperature characteristics and the negative electrode characteristics can be provided.

Further, since the solid electrolytes are used in the lithium secondary cell of the invention, the electrolytes of the two electrodes are not mixed, the stability with the high potential is excellent, the long life is provided upon inhibiting the deterioration of the performance even in repeating the charge/discharge cycle, and the potential stability is also high.

What is claimed is:

1. A lithium secondary battery comprising:
    a positive electrode containing a first solid electrolyte;
    a negative electrode containing a second solid electrolyte; and
    a layer of a third solid electrolyte between the positive and negative electrodes, wherein the first solid, second and third solid electrolytes contain different organic solvents or different combinations of organic solvents from each other.

2. A lithium secondary battery according to claim 1, wherein the layer of the third solid electrolyte has a higher ion conductivity than the ion conductivity of the solid electrolytes of the positive and negative electrodes.

3. A lithium secondary battery according to claim 1, wherein the first solid electrolyte contains a cyclo carbonate or a chain carbonate as a solvent.

4. A lithium secondary battery according to claim 3, wherein the first solid electrolyte contains propylene carbonate or a mixture of propylene carbonate and diethyl carbonate.

5. A lithium secondary battery according to claim 1, wherein the second solid electrolyte contains a cyclo carbonate or a chain carbonate as a solvent.

6. A lithium secondary battery according to claim 5, wherein the second solid electrolyte contains ethylene carbonate or a mixture of ethylene carbonate and diethyl carbonate.

7. A lithium secondary battery according to any one of claims 1 to 6, wherein the negative electrode contains graphite.

8. A lithium secondary battery comprising:
    a positive electrode containing a first solid electrolyte;
    a negative electrode containing a second solid electrolyte; and
    a layer of a third solid electrolyte containing a lactone between the positive and negative electrodes, wherein the first solid electrolyte, the second solid electrolyte and the third solid electrolyte are different.

9. A lithium secondary battery according to claim 8, wherein the layer of the third solid electrolyte has a higher ion conductivity than the ion conductivity of the solid electrolytes of the positive and negative electrodes.

10. A lithium secondary battery according to claim 8, wherein the first solid electrolyte contains a cyclo carbonate or a chain carbonate as a solvent.

11. A lithium secondary battery according to claim 10, wherein the first solid electrolyte contains propylene carbonate or a mixture of propylene carbonate and diethyl carbonate.

12. A lithium secondary battery according to claim 8, the second solid electrolyte contains a cyclo carbonate or a chain carbonate as a solvent.

13. A lithium secondary battery according to claim 12, wherein the second solid electrolyte contains ethylene carbonate or a mixture of ethylene carbonate and diethyl carbonate.

14. A lithium secondary battery according to claim 8, wherein the negative electrode contains graphite.

15. A lithium secondary battery comprising:
    a positive electrode containing a propylene carbonate electrolyte;
    a negative electrode containing an ethylene carbonate electrolyte; and
    a layer of a third solid electrolyte containing y-butyrolactone between the positive and negative electrodes.

16. A lithium secondary battery according to claim 8, wherein the layer of the third solid electrolyte contains a mixture of y-butyrolactone and diethyl carbonate as a solvent.

* * * * *